United States Patent [19]

Matsuura

[11] 4,060,893
[45] Dec. 6, 1977

[54] CUTTER

[75] Inventor: Haruo Matsuura, Tokyo, Japan

[73] Assignee: Kabushiki Kaisha Daisho, Japan

[21] Appl. No.: 658,064

[22] Filed: Feb. 13, 1976

[51] Int. Cl.² .......................... B26B 3/00; B26D 7/02
[52] U.S. Cl. ........................................ 30/310; 83/456;
   83/464; 83/490; 83/508.2
[58] Field of Search .......................... 30/300, 310, 382;
   83/452, 453, 456, 564, 596, 464, 455

[56] References Cited

U.S. PATENT DOCUMENTS

| 701,828 | 6/1902 | Arnold | 30/310 |
| 2,269,510 | 1/1942 | Bates | 30/310 |
| 3,845,676 | 11/1974 | Pierce | 83/464 X |

Primary Examiner—Willie G. Abercrombie
Attorney, Agent, or Firm—Robert E. Burns; Emmanuel J. Lobato; Bruce L. Adams

[57] ABSTRACT

A cutter for cutting a sheet-like material into a circular form, comprising a frame member including a sidewall portion for holding a sheet-like material to be cut against a surface of a flat body and defining a gap between the portion and the surface, a rotary member pivotally mounted on the frame member and capable of rotation within the gap, a handle for driving the handle, and a knife mounted on the rotary member and having a cutting edge which at least extends to the surface of the flat body.

3 Claims, 2 Drawing Figures

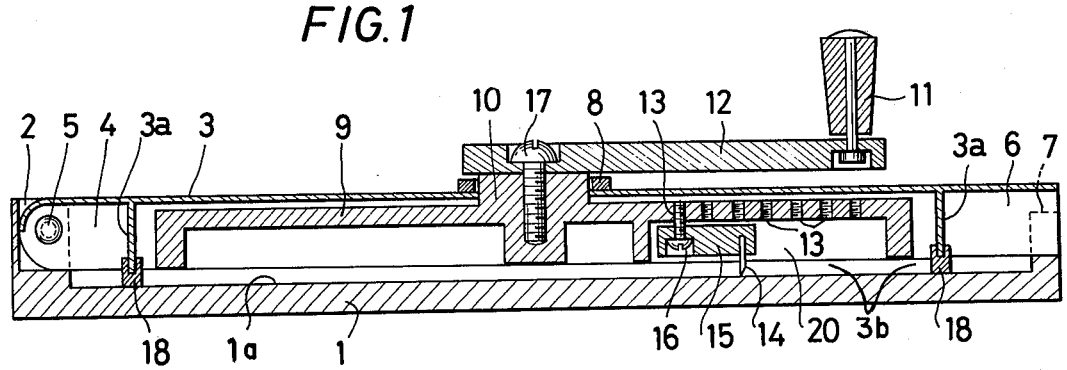
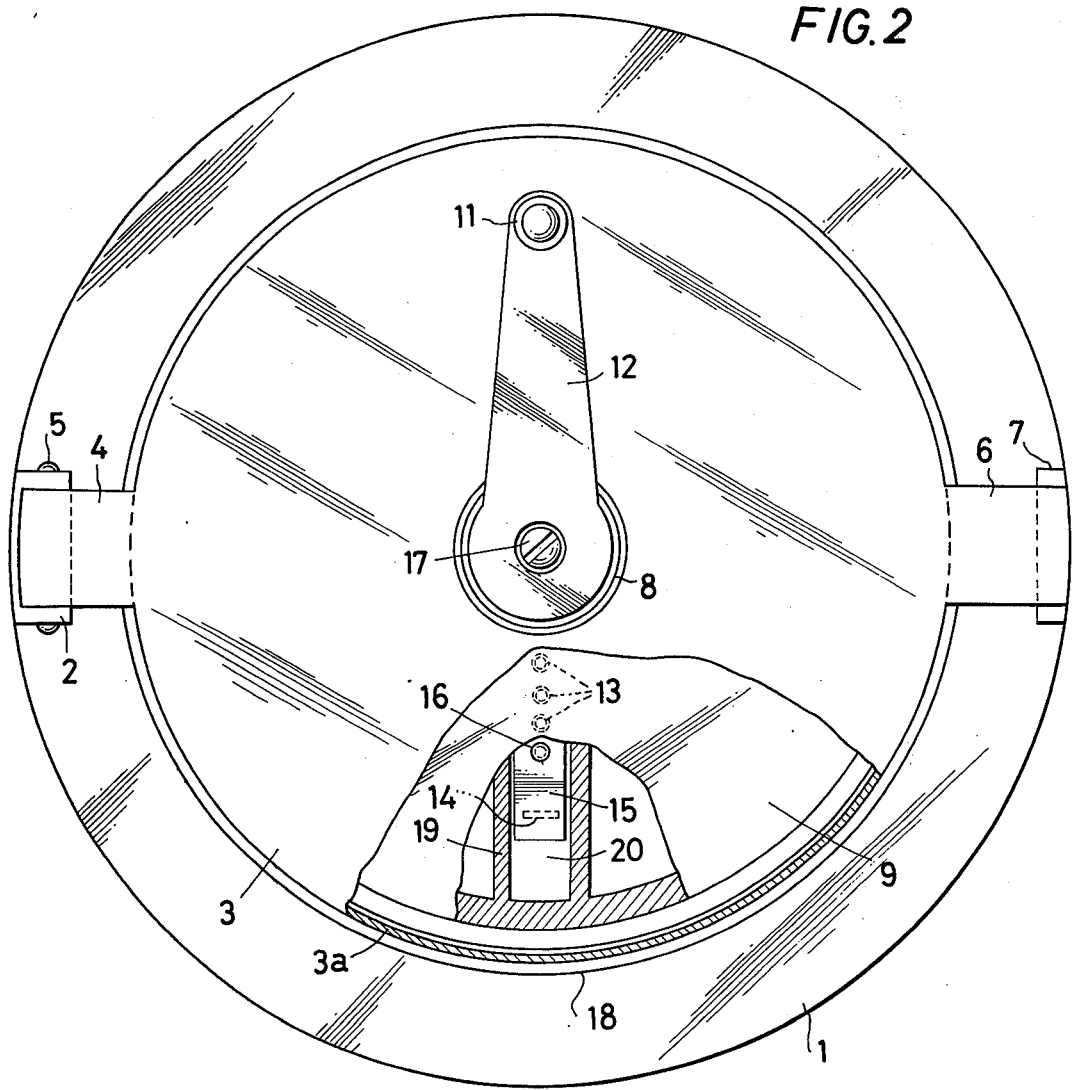

CUTTER

BACKGROUND OF THE INVENTION

The invention relates to a cutter, and more particularly, to a cutter which cuts a material such as photograph into a circular form.

It is frequently desired to cut a photograph into a circular form in order to apply it to a photograph mount or to inlay it into a picture frame or plaque. However, there has been no convenient cutter which is adapted for such use.

Therefore, it is an object of the invention to provide an apparatus for cutting a sheet-like material into a circular form and which is simple in construction and easy to use.

It is another object of the invention to provide a cutter capable of freely varying the size of a circular form into which a sheet-like material is to be cut.

It is a further object of the invention to provide a circular cutter having an easily interchangeable knife.

SUMMARY OF THE INVENTION

In accordance with the invention, there is provided a sheet cutting device comprising a frame member including a sidewall portion for holding a sheet-like material to be cut against a surface of a flat body and defining a gap between the portion and the surface, a rotary member pivotally mounted on the frame member and disposed within the gap, a handle for driving the rotary member, and a knife mounted on the rotary member and having a cutting edge which at least extends to the surface of the flat body.

In a practical embodiment of the cutter according to the invention, the frame member is pivotally mounted, on a base having a flat surface on which a sheet to be cut is placed, to be angularly movable between raised and lower positions, in such a way that when the frame member assumes the lower position, the sheet is held between the sidewall portion of the frame member and the base surface. In addition, the knife is mounted on a lockable tool rest which is radially movable toward the center of rotation of the rotary member.

BRIEF DESCRIPTION OF THE DRAWINGS

The above and other objects, features and advantages of the invention will become apparent from the following detailed description of an embodiment thereof shown in the drawings, wherein:

FIG. 1 is a cross section of the circular cutter according to the invention; and FIG. 2 is a plan view, partly broken away, of the cutter shown in FIG. 1.

DESCRIPTION OF THE PREFERRED EMBODIMENT

The sheet cutting device according to the invention includes a base 1 having a flat upper surface 1a. The base 1 is provided with a bracket 2, upstanding from this surface and pivotally supporting a frame 3 which has a bracket portion 4, supported from bracket 2 by a pivot 5 as shown in FIG. 1. The frame 3 has a cylindrical sidewall portion 3a which extends toward but not entirely to base 1, being of a reduced axial length and carrying a pad 18 on its lower end. The pad is shown as contacting base surface 1a to indirectly engage the base surface 1a for holding a sheet, consisting of sheet-like material and placed thereon. By virtue of the pivotal connection shown at 5, the frame 3 is angularly movable relative to the base 1. Diametrically opposite to the portion 4, the frame includes a lip 6, which is adapted to engage a rest 7 secured to the base 1 when the frame 3 assumes its lowermost position. The rest 7 serves preventing a lateral misalignment of the frame and maintaining it in an accurate position.

When the frame 3 is in its lowermost position, a gap 3b is defined by and between the frame and the base 1. A rotary member 9 is disposed in the gap. The rotary member 9 is rotatably mounted on the frame 3 by a bearing or supporting member 8, and includes a boss 10 to which an arm 12 of an external handle is firmly secured by a screw 17. In the embodiment shown, the rotary member 9 is in the form of a disc having a pair of radially extending ribs 19 which define a groove 20 therebetween. A slide 15 carrying a knife 14 is disposed in the groove 20, and is provided with a male thread member 16 which can be selectively engaged with one of a plurality of female threads 13 which are formed in the disc 9 at a plurality of radially displaced locations. Thus the slide 15 can be fixed in a selected position along the groove 20. The knife 14 is arranged so that its cutting edge lies in the tangential direction of an imaginary circle having its center coincident with the center of rotation of the disc 9 and bears against the base surface 1a when the frame 3 assumes its lowermost position.

In use, the frame 3 is raised by turning it about the pivot 5, and a sheet to be cut is placed on the base surface 1a. Then the frame 3 is turned in the opposite direction to its lowermost position, whereby the sheet is firmly held between the pad 18 and the base. When, thereupon, the handle 11 is manually rotated through one revolution, the sheet is cut into a circular form by the knife 14. The size of the circular form can be varied by selecting a particular thread 13 which is engaged by the male thread member 16 on the slide 15.

It should be noted that the configuration of the base, frame and rotary member is not limited to a circular form. For example, the frame may be formed as a cruciform beam, and the rotary member as an elongate arm. Therefore, it is intended that the scope of the invention be solely limited by the appended claims.

I claim:

1. A sheet cutting device for cutting sheets into a circular form, comprising a base having a flat upper base surface and having a bracket upstanding from the surface;

a frame pivoted to the bracket for angular pivoting movements between a raised position and a lower position, the frame having a sidewall secured thereto and the sidewall having a pad thereon at a free edge of the sidewall remote from the frame for engaging, in the lower position of the frame, a sheet lying on the base surface to determine the lower position of the frame, to hold the sheet, and to provide a gap between the base surface and the frame, the sidewall and pad being disposed to surround the gap; and a rotor rotatably mounted on the frame for rotation in the gap, having a handle for effecting the rotation, and having a cutting edge extending to the base surface when the frame, with the rotor and the knife thereon, is in the lower position, for cutting the sheet into a circular form by the rotation of the rotor and knife relative to the sheet held by the pad.

2. A device according to claim 1 including knife mounting means for effecting the mounting of the knife of the rotor so as to permit displacement of the knife, radially of the rotor, for cutting the sheet into circular forms of different diameters.

3. A device according to claim 2 in which the knife mounting means comprises a member supporting the knife and a bolt held by the member, the rotor having a plurality of threaded holes, at positions differently radially spaced from a center of the rotor's rotation, for engagement by the bolt.